US008278235B2

(12) United States Patent
Stockwell et al.

(10) Patent No.: US 8,278,235 B2
(45) Date of Patent: Oct. 2, 2012

(54) STRUCTURALLY ENHANCED CRACKING CATALYSTS

(75) Inventors: David Matheson Stockwell, Westfield, NJ (US); John M. Macaoay, Linden, NJ (US)

(73) Assignee: BASF Corporation, Florham Park, NJ (US)

( * ) Notice: Subject to any disclaimer, the term of this patent is extended or adjusted under 35 U.S.C. 154(b) by 844 days.

(21) Appl. No.: 11/765,784

(22) Filed: Jun. 20, 2007

(65) Prior Publication Data

US 2008/0314798 A1    Dec. 25, 2008

(51) Int. Cl.
*B01J 29/08*    (2006.01)
*C10G 11/05*    (2006.01)

(52) U.S. Cl. ......... 502/69; 208/106; 208/113; 208/118; 208/119; 208/120.01; 208/121; 208/122; 502/63; 502/64; 502/65; 502/67; 502/68; 502/70

(58) Field of Classification Search ..................... 502/63, 502/64, 69, 68, 65, 67, 70; 208/118, 120.01, 208/106, 113, 119, 121, 122

See application file for complete search history.

(56) References Cited

U.S. PATENT DOCUMENTS

| 4,394,251 | A | | 7/1983 | Miller |
|---|---|---|---|---|
| 4,420,419 | A | | 12/1983 | Ogawa et al. |
| 4,427,577 | A | | 1/1984 | Koetsier |
| 4,919,787 | A | | 4/1990 | Chester et al. |
| 4,938,863 | A | | 7/1990 | Degnan et al. |
| 5,077,253 | A | * | 12/1991 | Chu et al. ........................ 502/61 |
| 5,082,814 | A | | 1/1992 | Stockwell et al. |
| 5,179,054 | A | * | 1/1993 | Schipper et al. ................. 502/67 |
| 5,200,382 | A | | 4/1993 | Cody et al. |
| 5,228,980 | A | | 7/1993 | Stockwell et al. |
| 5,286,370 | A | * | 2/1994 | Chu et al. ................. 208/120.25 |
| 5,935,889 | A | | 8/1999 | Murrell et al. |
| 5,972,205 | A | | 10/1999 | Tsang et al. |
| 6,013,851 | A | * | 1/2000 | Verrelst et al. ................. 585/533 |
| 6,225,255 | B1 | | 5/2001 | Shibasaki |
| 6,649,802 | B1 | * | 11/2003 | Frame et al. ................... 585/533 |
| 6,656,347 | B2 | | 12/2003 | Stockwell et al. |
| 6,673,235 | B2 | | 1/2004 | Harris et al. |
| 6,696,378 | B2 | | 2/2004 | Gibson et al. |
| 6,699,811 | B1 | | 3/2004 | Mohr et al. |
| 6,710,003 | B2 | * | 3/2004 | Jan et al. .......................... 502/60 |
| 6,716,338 | B2 | * | 4/2004 | Madon et al. ............ 208/120.01 |

(Continued)

FOREIGN PATENT DOCUMENTS

EP    0118632    9/1984

(Continued)

OTHER PUBLICATIONS

MacZura, "Aluminum Oxide (Alumina), Calcined, Tabular, and Aluminate Cements" in The Kirk-Othmer Encyclopedia of Chemical Technology, Wiley, 2003, posted on-line Jan. 17, 2003.*

(Continued)

*Primary Examiner* — In Suk Bullock
*Assistant Examiner* — Bradley Etherton
(74) *Attorney, Agent, or Firm* — Bernard Lay

(57) ABSTRACT

A cracking catalyst contains a substantially inert core and an active shell, the active shell containing a zeolite catalyst and a matrix. The catalyst is formed by spray-drying a slurry containing water, substantially inert microspheres and a zeolite precursor and crystallizing zeolite in the active shell to create the cracking catalyst. Methods of using the cracking catalyst are also described.

23 Claims, 10 Drawing Sheets

U.S. PATENT DOCUMENTS

| | | |
|---|---|---|
| 6,812,181 B2 | 11/2004 | van der Berge et al. |
| 6,867,341 B1 | 3/2005 | Abrevaya et al. |
| 6,958,305 B2 | 10/2005 | Verduijn et al. |
| 7,101,473 B2 * | 9/2006 | Hurley .................. 208/113 |
| 7,320,782 B1 * | 1/2008 | Jacobsen et al. ............. 423/700 |
| 2004/0235642 A1 | 11/2004 | Xu et al. |
| 2005/0284799 A1 | 12/2005 | Bauer et al. |
| 2008/0064912 A1 * | 3/2008 | Jacobsen et al. ............. 585/899 |

FOREIGN PATENT DOCUMENTS

| | | |
|---|---|---|
| EP | 0697247 | 9/1999 |
| WO | 95/33561 | 12/1995 |
| WO | 99/28031 | 6/1999 |
| WO | 2005/082530 | 9/2005 |

OTHER PUBLICATIONS

International Search Report for PCT/US2008/066637 Mailed Aug. 28, 2009.

Written Opinion for PCT/US2008/066637 Mailed Aug. 28, 2009.

Van Der Puil, et al; Preparation and Catalytic Testing of Zeolite Coatings on Preshaped Alumina Supports; Microporous and Mesoporous Materials 27 (1999) 95-106.

* cited by examiner

Fig. 1

Table 1. Crystallization of the Invention

| | Example 1 | Example 2 | Example 3 | Example 4 |
|---|---|---|---|---|
| Microsphere of Crystallization of | 20257-50-1 | 20257-52-1 | 20,395-36-1 | |
| Cryx NB# | 20257-38-1 | 20257-38-1 | 20395-31-2c | |
| MS NB# | | | | |
| Recipe | Invention | Invention | Composite | |
| Hydrous Clay | 25% | 25% | 25% | |
| Mullite | 50% | 50% | 50% | |
| Spinel | 25% | 25% | 25% | |
| Binder %SiO2 | 2.56% | 2.56% | 6.00% | |
| Binder modulus, w/w | 10,000 | 10,000 | 10,000 | |
| Theoretical NaY max. | 50 | 57 | 57 | |
| MS-2 (metakaolin) | 0.00% | 7.50% | 7.50% | |
| SiO2/Na2O, w/w | 2.80 | 2.73 | 3.02 | |
| H2O/Na2O, w/w | 9.00 | 9.00 | 9.00 | |
| SiO2/Al2O3, w/w | 9.50 | 9.50 | 9.50 | |
| Seeds | 0.0040 | 0.0040 | 0.0040 | |
| Microsphere grams | 250.0 | 175.8 | 371.0 | |
| Seeds, g | 185.2 | 140.7 | 296.3 | |
| N-BRAND, g | 337.2 | 398.9 | 757.9 | |
| 50 wt % NaOH | 89.6 | 79.4 | 128.1 | |
| H2O, g | 414.8 | 373.9 | 660.1 | |
| SDS, g | 0.0 | 0.0 | 0.0 | |
| MS2, g | 0.0 | 14.2 | 28.9 | |
| Zeolite % at 12 h | 7.3 | 31.9 | 12.4 | |
| Zeolite % at 16 h | 28.2 | 48.9 | 40.0 | |
| Zeolite % at 20 h | 40.0 | 48.0 | 44.0 | |
| Hours Crystallized | 24 | 20 | 23 | |
| XRD wt% NaY | 47 | 50 | --- | |
| UCS, A | 24.66 | 24.66 | --- | |
| Na2O, wt% | 7.8 | 8.57 | 8 | |
| BET, m2/g | 418 | 431 | 388 | |
| MSA, m2/g | 78 | 72 | 58 | |
| ZSA, m2/g | 341 | 358 | 330 | |
| ZSA/6.6 = % NaY | 52 | 54 | 50 | |
| Microtrac APS, um | 89 | 93 | 108 | |
| Roller, wt%/h | 21 | 6 | 6 | |
| Hg pore volume, ml/g, by pore diameter intervals | | | | |
| 40-100 A | 0.084 | 0.106 | 0.072 | |
| 100-600 A | 0.126 | 0.120 | 0.081 | |
| 600-20,000 A | 0.143 | 0.107 | 0.111 | |
| 40-20,000 A | 0.354 | 0.332 | 0.265 | |
| ABD (VF), g/ml | 0.66 | 0.69 | 0.76 | |

Fig. 2

| Table 2. Crystallization of the Comparative catalysts | | | |
|---|---|---|---|
| Microsphere of | Example 5 | Example 5 | Example 6 |
| Crystallization of | Example 7 | Example 8 | Example 9 |
| Cryx NB# | 20395-17-2 | 20276-16-4 | 20276-43-2 |
| MS NB# | 20276-38-1 | 20276-38-1 | 20276-38-2 |
| Recipe | 6,656,347 | 6,656,347 | 6,696,378 |
| Hydrous Clay | 33% | 33% | 53% |
| Mullite | 67% | 67% | 0% |
| Spinel | 0% | 0% | 57% |
| Binder %Si2O | 4.0% | 4.0% | 8.0% |
| Binder modulus, w/w | 2.9 | 2.9 | 2.9 |
| Theoretical NaY max. | 65 | 68 | 75 |
| MS-2 (metakaolin) | 10.0% | 15.0% | 7.5% |
| SiO2/Na2O, w/w | 2.63 | 2.63 | 2.63 |
| H2O/Na2O, w/w | 7.00 | 7.00 | 7.00 |
| SiO2/Al2O3, w/w | 7.00 | 7.00 | 5.80 |
| Seeds | 0.0040 | 0.0040 | 0.0040 |
| Microsphere grams | 361.0 | 342.0 | 558.7 |
| Seeds, g | 516.0 | 516.0 | 444.4 |
| N-BRAND, g | 0.0 | 0.0 | 0.0 |
| 50 wt.% NaOH | 25.3 | 12.2 | 55.5 |
| H2O, g | 345.0 | 347.9 | 606.8 |
| SDS, g | 757.0 | 928.0 | 1438.9 |
| MS2, g | 38.8 | 58.0 | 41.3 |
| Zeolite % at 12 h | --- | 61 | 59.0 |
| Zeolite % at 16 h | 68 | 54 | 57 |
| Zeolite % at 20 h | --- | 21 | 70 |
| Hours Crystallized | 20 | 21 | 22 |
| XRD wt% NaY | 50 | 51 | 52 |
| UCS, A | 24.69 | 24.70 | 24.73 |
| Na2O, wt% | 9.50 | 10.5 | 12.70 |
| BET, m2/g | 496 | 489 | 520 |
| MSA, m2/g | 59 | 66 | 72 |
| ZSA, m2/g | 437 | 423 | 448 |
| ZSA/6.6 = % NaY | 66 | 64 | 68 |
| Microtrac APS, um | 82 | 82 | 84 |
| Roller, wt%/h | 11 | 9 | 6 |
| Hg pore volume, ml/g, by pore diameter intervals | | | |
| 40-100 A | --- | --- | 0.077 |
| 100-600 A | --- | --- | 0.1293 |
| 600-20,000 A | --- | --- | 0.2 |
| 40-20,000 A | --- | --- | 0.3712 |
| ABD (VF), g/ml | 55% | 55% | |

Fig. 3

| Table 3 | Exchange and Steaming of the Invention | | | | | | |
|---|---|---|---|---|---|---|---|
| Microsphere of | Example 1 | Example 1 | | Example 2 | | | |
| Crystallization of | Example 2 | Example 3 | | Example 4 | | | |
| Catalyst of | Example 9 | Example 10 | | Examples 11-14 | | | |
| 1x1 | | | | | | | |
| Calcination | uncontrolled | uncontrolled | | 1150 F | | | |
| Recipe | Invention | Invention | | Composite | | | |
| NB# | 20542-1-1 | 20542-2-1 | | 20395-37-1c | | | |
| %REO | 2.85 | 2.84 | | 2.5 | | | |
| %Na2O | 1.725 | 1.88 | | 2 | | | |
| BET, m2/g | 362 | 364 | | 347 | | | |
| MSA, m2/g | 87 | 79 | | 68 | | | |
| ZSA, m2/g | 275 | 285 | | 279 | | | |
| XRD wt% NaY | 37 | 41 | | --- | | | |
| UCS, A | 24.62 | 24.6 | | | | | |
| 2x2 | | | | | | | |
| Recipe | Invention | Invention | Composite | | | Composite 3x2 | |
| NB# | 20542-1-2 | 20542-2-2 | 20395-37-4c | | | 20395-50-1 | |
| XRD wt% NaY | 36 | 38 | --- | | | --- | |
| UCS, A | 24.5 | 24.49 | --- | | | --- | |
| Hg pore volume, ml/g, by pore diameter intervals | | | | | | | |
| 40-100 A | 0.087 | 0.114 | --- | | | --- | |
| 100-600 A | 0.157 | 0.145 | --- | | | --- | |
| 600-20,000 A | 0.168 | 0.106 | --- | | | --- | |
| 40-20,000 A | 0.413 | 0.366 | --- | | | --- | |
| BET, m2/g | 348 | 364 | --- | | | 329 | |
| MSA, m2/g | 85 | 83 | --- | | | 63 | |
| ZSA, m2/g | 262 | 281 | --- | | | 266 | |
| REO wt% | 2.15 | 1.85 | 2.1 | | | 2.1 | |
| Na2O, wt% | 0.13 | 0.16 | 0.21 | | | 0.11 | |
| 1500 F Steamed Properties. Active Components Steamed without Blending | | | | | | | |
| Catalyst of | Example 9 | Example 10 | Example 11 | Example 12 | Example 13 | Example 14 | |
| Steaming time | 4 h | 4 h | 4 h | 30 min | 60 min | 90 min | |
| NB # | 20542-1-2s | 20542-2-2s | 20395-37-4s | 20395-50-1s | 20395-50-2s | 20395-50-3s | |
| UCS, A | 24.25 | 24.28 | --- | 24.35 | 24.34 | 24.31 | |
| BET, m2/g | 248 | 258 | 180 | 255 | 248 | 242 | |
| MSA, m2/g | 74 | 75 | 52 | 61 | 60 | 59 | |
| ZSA, m2/g | 174 | 183 | 128 | 194 | 188 | 183 | |
| REO wt% | 2.4 | 2.4 | 2.46 | 3.2 | 3.1 | 3.1 | |
| ZSA/MSA steamed | 2.4 | 2.4 | 2.46 | N/A | N/A | N/A | |
| % ZSA maint. re Na-form | 51.2% | 50.9% | 38.79% | | | | |

Fig. 4

Table 4

| Microsphere of Crystallization of Catalyst of | Example 5 Example 7 Example 15 HPV Comparative | Example 5 Example 8 Example 16 HPV Comparative | Example 6 Example 9 Example 17 LPV Comparative |
|---|---|---|---|
| 1x1 | | | |
| Recipe | 6,656,347 | 6,656,347 | 6,696,378 |
| NB# | 20257-23-1 | 20257-24-1 | 20395-23-1a |
| %REO | 3.77 | 3.9 | 3 |
| %Na2O | 2.3 | 2.415 | 2.7 |
| BET, m2/g | 431 | 439 | 474 |
| MSA, m2/g | 77 | 84 | 96 |
| ZSA, m2/g | 354 | 355 | 378 |
| XRD wt% NaY | 35 | 37 | 43 |
| UCS, A | 24.68 | 24.7 | 24.65 |
| 2x2 | | | |
| Recipe | 6,656,347 | 6,656,347 | 6,696,378 |
| NB# | 20257-23-2 | 20257-24-2 | 20395-47-1 |
| XRD wt% NaY | 34 | 35 | — |
| UCS, A | 24.58 | 24.58 | — |
| Hg pore volume, ml/g, by pore diameter intervals | | | |
| 40-100 A | 0.084 | 0.080 | 0.094 |
| 100-600 A | 0.151 | 0.168 | 0.054 |
| 600-20,000 A | 0.199 | 0.179 | 0.027 |
| 40-20,000 A | 0.434 | 0.428 | 0.176 |
| BET, m2/g | 396 | 402 | 474 |
| MSA, m2/g | 78 | 76 | 83 |
| ZSA, m2/g | 318 | 326 | 391 |
| REO wt% | 3.11 | 3.29 | 2.9 |
| Na2O, wt% | 0.17 | 0.16 | 0.33 |

1500 F Steamed Properties. Active Components Steamed without Blending

| Catalyst of | Example 15 | Example 16 | Example 17 |
|---|---|---|---|
| Steaming time | 4 h | 4 h | 4 h |
| NB # | 20257-23-2s | 20257-24-2s | 20395-47-1s |
| UCS, A | 24.29 | 24.30 | 233 |
| BET, m2/g | 235 | 240 | 78 |
| MSA, m2/g | 59 | 57 | 155 |
| ZSA, m2/g | 176 | 183 | 2.00 |
| ZSA/MSA steamed | 3.0 | 3.2 | 35 |
| % ZSA maint. re Na-form | 40 | 43 | |

STRUCTURALLY ENHANCED CRACKING CATALYSTS

BACKGROUND

Oil refinery cracking processes allow the production of light products such as liquified petroleum gas (LPG) and gasoline from heavier crude oil distillation fractions such as gas oils and residues. Current cracking technologies can be classified into the two general categories: thermal cracking (also known as steam cracking) and catalytic cracking. Specifically, Fluid Catalytic Cracking (FCC) is a conversion process in a refinery for upgrading low value heavy hydrocarbons into high value light distillates and LPG. The process employs solid acid catalysts such as zeolites to promote cracking reactions in a riser reactor/fluid bed regenerator system.

FCC catalysts contain zeolites as an active component. Such catalysts generally take the form of small particles containing both an active zeolite component and a non-zeolite component. Frequently, the non-zeolitic component is referred to as the matrix for the zeolitic component of the catalyst.

In FCC catalysts, the active zeolitic component is typically incorporated into the catalyst by one of two general techniques. In one technique, the zeolitic component is crystallized and then incorporated into matrix in a separate step. In the second technique, an in-situ technique, particles are first formed and the zeolitic component is then crystallized in the particles themselves to provide FCC catalysts containing both zeolitic and non-zeolitic components.

Two products that are particularly undesirable in commercial catalytic cracking processes are coke and hydrogen. Even small increases in the yields of these products relative to the yield of gasoline can cause significant practical problems. For example, increases in the amount of coke produced can cause undesirable increases in the heat that is generated by burning off the coke during the highly exothermic regeneration of the catalyst. Conversely, insufficient coke production can also distort the heat balance of the cracking process. In addition, in commercial refineries, expensive compressors are used to handle high volume gases, such as hydrogen. Increases in the volume of hydrogen produced, therefore, can add substantially to the capital expense of the refinery.

Improvements in cracking activity and gasoline selectivity of cracking catalysts do not necessarily go hand in hand. Thus, a cracking catalyst can have outstandingly high cracking activity, but if the activity results in a high level of conversion to coke and/or gas at the expense of gasoline the catalyst has limited utility. Catalytic cracking activity in present day FCC catalysts is attributable to both the zeolite and non-zeolite (e.g., matrix) components. Zeolite cracking tends to be gasoline selective. Matrix cracking tends to be less gasoline selective.

Recently, however, FCC apparatus have been developed which drastically reduce the contact time between the catalyst and the feed which is to be cracked. Conventionally, the reactor is a riser in which the catalyst and hydrocarbon feed enter at the bottom of the riser and are transported through the riser. The hot catalyst effects cracking of the hydrocarbon during the passage through the riser and upon discharge from the riser, the cracked products are separated from the catalyst. The catalyst is then delivered to a regenerator where the coke is removed, thereby cleaning the catalyst and at the same time providing the necessary heat for the catalyst in the riser reactor. The newer riser reactors operate at lower residence time and higher operating temperatures to minimize coke selectivity and delta coke. Several of the designs do not even employ a riser, further reducing contact time to below one second. Gasoline and dry gas selectivity can improve as a result of the hardware changes. These FCC unit modifications are marketed as valuable independent of the type of catalyst purchased, implying an absence of systematic problems in state of the art catalyst technology.

The processing of increasingly heavier feeds in FCC type processes and the tendency of such feeds to elevate coke production and yield undesirable products has also led to new methods of contacting the feeds with catalyst. The methods of contacting FCC catalyst for very short contact periods are of particular interest. Thus, short contact times of less than 3 seconds in the riser, and ultra short contact times of 1 second or less show improvements in selectivity to gasoline while decreasing coke and dry gas production. However, higher contact times are more prevalent in older FCC units where the times can be up to 7 seconds.

To compensate for the continuing decline in catalyst to oil contact time in FCC processing, the "equilibrium" catalysts in use are tending to become more active. Thus, attempts at increasing the total surface area of the catalyst are being pursued and as well, the level of rare earth oxide promoters added to the catalysts is increasing. Moreover, cracking temperatures are rising to compensate for the reduction in conversion. Unfortunately, the API gravity of the bottoms formed during short contact time (SCT) often increases after a unit revamp, leading some to suggest that the heaviest portion of the hydrocarbon feed takes longer to crack. Further, while a high total surface area of the catalyst is valued, the FCC process still values attrition resistance.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The subject invention provides an FCC catalyst with a substantially inactive core and an active shell. The invention described herein provides a novel technology with one or more of the utilities of (i) improved yields for the previously ill served low opacity FCC catalyst market, (ii) further yield improvements for the gas oil and resid markets already served by Structurally Enhanced Cracking Catalysts that were disclosed earlier, (iii) reduce costs through reduced usages of at least one of ammonium nitrate, rare earths, and boehmite alumina.

One aspect of the invention relates to a cracking catalyst that contains a substantially inert core and an active shell, the active shell containing a zeolite catalyst and a matrix.

Another aspect of the invention relates to various methods of making the cracking catalyst. For example, one method of making a cracking catalyst with an active shell at least partially surrounding a substantially inert core involves combining at least water, substantially inert core microspheres, a zeolite precursor, and a matrix precursor to form a slurry; and spray drying the slurry to form a novel precursor to the cracking catalyst.

Another method of making a cracking catalyst with an active shell at least partially surrounding a substantially inert core involves combining at least water, substantially inert core microspheres, a zeolite, and a matrix to form a slurry; and spray drying the slurry to form a novel cracking catalyst.

Yet another aspect of the invention relates to a cracking process involving contacting a hydrocarbon feedstream and a cracking catalyst containing a substantially inert core and an active shell, the active shell containing a zeolite catalyst and a matrix in a reactor at a suitable temperature to provide a cracked product.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF SUMMARY OF THE DRAWINGS

FIG. 1 is Table 1 reporting experimental data associated with crystallization properties and aspects of the FCC catalysts described herein.

FIG. 2 is Table 2 reporting experimental data associated with crystallization properties and aspects of conventional FCC catalysts.

FIG. 3 is Table 3 reporting experimental data of exchange and steaming characteristics of the FCC catalysts described herein.

FIG. 4 is Table 4 reporting experimental data associated with finished FCC catalysts.

DETAILED DESCRIPTION

Figure 5:
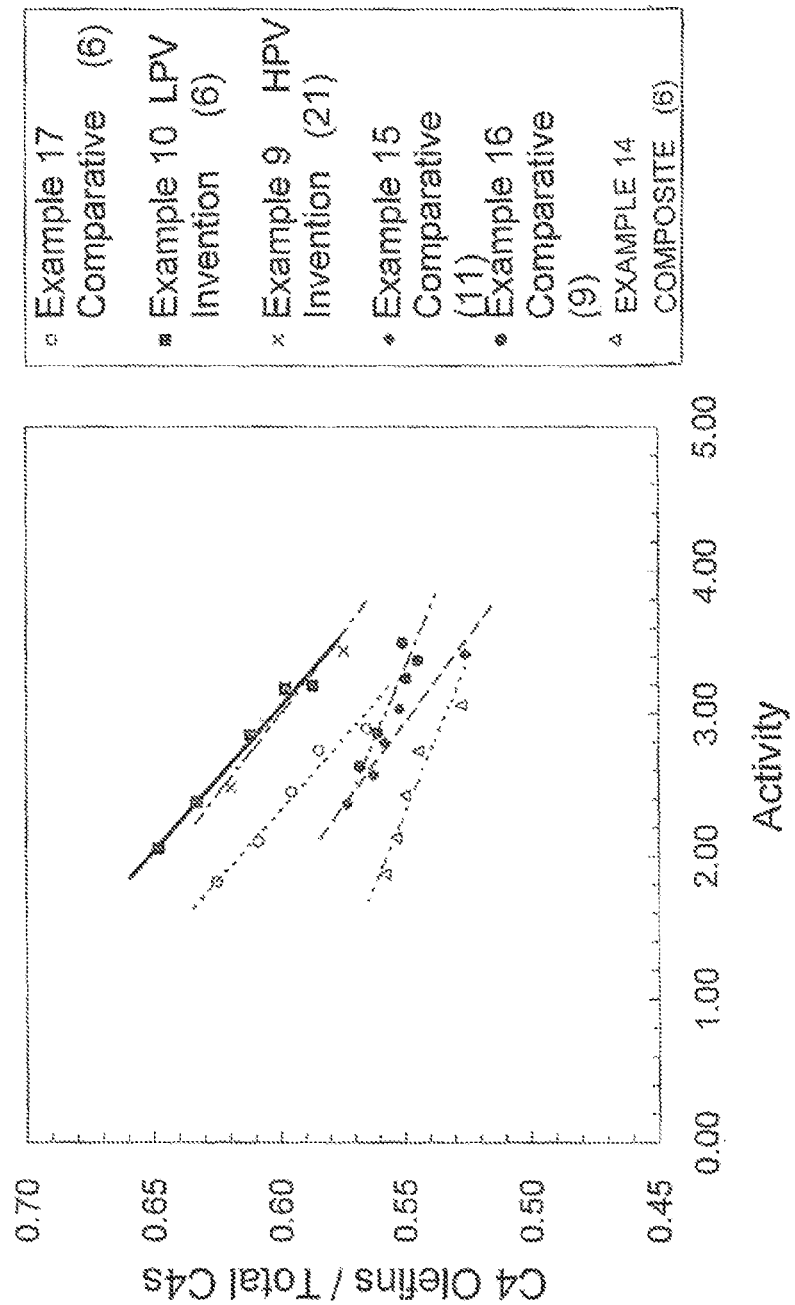
FIG. 5 is graph reporting experimental data indicating the relationship between activity and the fractional amount of C4 olefins versus total C4 compounds.

The FCC catalyst described herein displays either improved yields of cracking products produced by the catalytic process, such as gasoline and/or propylene while maintaining attrition resistance when compared to conventional FCC catalysts, or improves attrition resistance without sacrificing cracked product yields. Achieving advances in both increased yields and increased attrition resistance is difficult as one benefit is normally traded off for another. The prior art provides methods for sliding up and down the performance curve defined by these tradeoffs. The FCC catalysts described herein provide a means to operate off the defined performance curve of the prior art. An aspect of the discovery lies in identifying mass transfer issues as a source of limitations in the FCC catalytic process. One of ways in which the FCC catalyst described herein addresses the mass transfer issues is by reducing the diffusion path length.

A core/shell FCC catalyst is provided so that a majority of the catalyst volume is in an active shell containing matrix and zeolite and a minority of the catalyst volume is in a substantially inert core having substantially less cracking activity per unit volume. In one embodiment, the core has negligible cracking activity per unit volume. The diffusion path length from the exterior of the catalyst through the available active catalyst is therefore shorter than a conventional catalyst that does not have a substantially inert core but does have the same overall diameter. A major amount or majority refers to 50% or more while a minor amount or minority refers to less than 50%.

In one embodiment, the FCC catalyst contains from 50% to about 95% by volume of an active shell and from about 5% to less than 50% by volume of a substantially inert core. In another embodiment, the FCC catalyst contains from about 60% to about 90% by volume of an active shell and from about 10% to about 40% by volume of a substantially inert core. In yet another embodiment, the FCC catalyst contains from about 65% to about 85% by volume of an active shell and from about 15% to about 35% by volume of a substantially inert core. In still yet another embodiment, the FCC catalyst contains from about 70% to about 80% by volume of an active shell and from about 20% to about 30% by volume of a substantially inert core.

The active shell may have either a relatively low pore volume or a relatively high pore volume, depending on a number of factors including the specific compounds cracked, the desired products of the cracking process, and the constraints of the cracking process. In embodiments where the active shell may have a relatively low pore volume, the active shell is quite attrition resistant and the catalyst desirably yields low fines and stack opacity. Due to the reduced diffusion path length of the FCC catalyst described herein compared to conventional catalysts that do not have a substantially inert core, cracking yields are improved even if both catalysts have comparable pore volume and attrition resistance.

In embodiments where the active shell has a relatively high pore volume, improved yields of cracking products are obtained from the catalytic process, such as gasoline, compared to our own prior art Structurally Enhanced Cracking Catalysts, or other more conventional catalysts that do not have a substantially inert core. While not wishing to be bound by any theory, it is believed that the substantially inert core reduces the diffusion path length, leading to the improved yields of cracking products. Prior art FCC catalysts with a relatively high pore volume have relatively low attrition resistance, but the higher pore volume was useful because it had maximized gasoline. It was not at all clear whether further increases in such prior art catalyst pore volume would have any impact on gasoline yields, and indeed, no improvement is expected if, as many believed, that intraparticle mass transfer is in no way limiting. Further, practical constraints on catalyst attrition losses such as regenerator stack opacity and expander catalyst deposits limit the degree which catalyst pore volume can be increased in practice. Thus further gasoline improvements are substantially not accessible by higher pore volume.

The substantially inert core contains a material that is either not directly involved or minimally involved in the catalytic cracking process. If the properties of the inert core are suitable, subsequent crystallization after spray drying (described later) yields zeolite and active matrix residue confined largely to the active shell region and comparatively little, if any, residual zeolite content or active matrix surface area remaining in the interior substantially inert core.

When using in situ processing to form the FCC catalysts described herein, the composition and structure of the substantially inert core material is important in order to exclude or minimize to the extent possible the nucleation and/or growth of any zeolite inside the substantially inert core. The substantially inert core may have a minimum of mesoporous matrix surface area and cracking activity after crystallization. Non-limiting examples of substantially inert core materials include inert calcined kaolin activity-reducing microspheres containing mullite and alpha alumina microspheres (typically formed by calcining gibbsite).

In order to make the kaolin activity-reducing microspheres containing mullite and alpha alumina microspheres, gibbsite or kaolin is dispersed, formed or spray dried to obtain a target average particle size, and then calcined. The kaolin is calcined to form a relatively large proportion of mullite. In one embodiment, the calcined kaolin microspheres contain at least about 20% by weight mullite. In another embodiment, the calcined kaolin microspheres contain at least about 40% by weight mullite. In yet another embodiment, the calcined kaolin microspheres contain at least about 50% by weight mullite.

Calcining (gibbsite or kaolin) generally increases resultant bulk density substantially, indicating a loss of pore volume and increase in crystallite size, and in the case of calcined kaolin, an increase in mullite content. In one embodiment, calcining to form kaolin activity-reducing microspheres containing mullite and/or alpha alumina microspheres is conducted at a temperature of about 2050° F. or more for a time from about 0.5 to about 10 hours in laboratory trays. In another embodiment, calcining to form kaolin activity-reducing microspheres containing mullite and/or alpha alumina microspheres is conducted at a temperature of about 2100° F. or more for a time from about 1 to about 7 hours. In yet another embodiment, calcining to form kaolin activity-reducing microspheres containing mullite and/or alpha alumina microspheres is conducted at a temperature of about 2300° F. or more for a time from about 2 to about 4 hours in laboratory trays. Commercial calcinations are typically done in rotary calciners at similar temperatures but typically shorter residence times.

The substantially inert core has a lower surface area than the active shell in the finished catalyst of the invention, generally to prevent excessive cracking activity inside the substantially inert core. In one embodiment, the substantially inert core has a surface area less than about 100 m²/g of core. In another embodiment, the substantially inert core has a surface area less than about 60 m²/g. In yet another embodiment, the substantially inert core has a surface area less than about 40 m²/g.

When the substantially inert core material includes one or more of calcined kaolin, kaolin activity-reducing microspheres containing mullite, and alpha alumina, heating to provide microspheres of low pore volume subsequently limits space available for the zeolite to grow therein during crystallization, with the net result being a low zeolite, low matrix area, low activity, quasi-inert core.

The active shell of the FCC catalysts contains a zeolite component and a matrix component. Other components may be present. The zeolite is a major contributor for the catalyst activity. Examples of the zeolite component include Y zeolite and beta zeolite. The zeolite can be treated with various modifications such as dealumination, rare earth exchange, phosphorous treatment, etc, to improve a property such as activity or stability. Although the term zeolite is typically construed to include materials containing silica and optionally alumina, as used herein, zeolite further includes compounds where the silica and alumina portions may be replaced in whole or in part with other oxides. For example, germanium oxide, tin oxide, phosphorus oxide, and mixtures thereof can replace the silica portion. Boron oxide, iron oxide, gallium oxide, indium oxide, and mixtures thereof can replace the alumina portion. Accordingly, zeolite as used herein, includes not only materials containing silicon and, optionally, aluminum atoms in the crystalline lattice structure thereof, but also materials which contain suitable replacement atoms for such silicon and aluminum, such as gallosilicates, borosilicates, ferrosilicates, and the like.

Examples of typical matrix materials include one or more of compounds such as silica, alumina such as gamma-alumina, mullite, silica-alumina, silica-magnesia, titania, zirconia, and clays such as bentonite, attapulgite, clarit, Fuller's earth, diatomaceous earth, kaolinite, halloysite, or montmorillonite. The matrix component can serve several purposes. It can be used to bind the zeolite component to form the active shell of the catalyst particles as well as bind the active shell to the substantially inert core. It can serve as a diffusion medium for the transport of feed and product molecules. In many cases, the matrix has cracking activity on its own and serves to improve bottoms upgrading. It also can act as a filler which dilutes the active shell to moderate the catalyst activity. In addition, the matrix can help heat transfer by providing bulk properties (heat transfer during regeneration and cracking and heat storage in large-scale catalytic cracking). The matrix may act as a sink for sodium in the sieve thus adding stability to the zeolite present in the active shell. The matrix may further serve by stabilizing the FCC catalyst towards heat and steam and mechanical attrition. In some instances the matrix provides high porosity so that the zeolite in the active shell can be used to its maximum capacity and regeneration can be improved.

The zeolite and matrix are typically formed during crystallization, which is further described below. Once formed, in one embodiment, the active shell of the FCC catalysts contain from about 40% to about 90% by weight of a zeolite component and from about 10% to about 60% by weight of a matrix component. In another embodiment, the active shell of the FCC catalysts contain from about 50% to about 80% by weight of a zeolite component and from about 20% to about 50% by weight of a matrix component. In yet another embodiment, the active shell of the FCC catalysts contain from about 55% to about 70% by weight of a zeolite component and from about 25% to about 40% by weight of a matrix component.

The zeolite and matrix can be formed during crystallization from active shell precursors that are spray dried and heated. Examples of active shell precursors include hydrous kaolin, other clay such as bentonite or attapulgite, calcined kaolin, metakaolin, calcined kaolin containing mullite, mullite, alumina, silica, alumina-silica, and any of calcined alumina, calcined silica, calcined alumina-silica, calcined kaolin in spinel form. Further examples of commercially available active shell precursors include those under the trade designations LHT, ASP® 600 or ASP® 400 hydrous kaolin derived from coarse white kaolin crudes, Satintone® No. 1 and Ansilex® 93 calcined kaolin, Metamax® metakaolin, M-93 mullite powder, all available from BASF Corporation.

Calcined kaolin in spinel form is made by calcining hydrous kaolin clay at least substantially through its characteristic exotherm. During calcination, a substantial portion of the clay may be agglomerated into larger particles. Consequently, after calcination, any agglomerated material may be pulverized into finely divided calcined clay in a pulverizer.

When using any of the active shell precursors, one or more of the active shell precursors can have a relatively small particle size. For example, when using hydrous kaolin, calcined kaolin in spinel form, or metakaolin, one or more of these materials has a relatively small particle size. In one embodiment, one or more of the active shell precursors has a relatively small particle size where at least 90% by weight of the particles have a size of about 2 microns or less. In another embodiment, one or more of the active shell precursors has a relatively small particle size where at least 90% by weight of the particles have a size of about 1 micron or less.

Most briefly, the invention comprises the general processes set forth in U.S. Pat. Nos. 4,493,902; 5,082,814; 6,656,347; 6,673,235; 6,696,378; and 6,716,338, which are hereby incorporated by reference, now employed to make the FCC catalysts of the invention wherein a substantially inert core microsphere is added to the slurry that is spray dried in said patents.

The processes for making the FCC catalysts involve several acts. The active shell precursors and substantially inert core microspheres are slurried with water. A zeolite initiator and a source of sodium silicate may also be introduced into the slurry.

The zeolite initiator optionally used may be provided from a number of sources. For example, the zeolite initiator may contain recycled fines produced during the crystallization process itself. Other zeolite initiators that may be used include fines produced during the crystallization process of another zeolite product or an amorphous zeolite initiator in a sodium silicate solution. As used herein, "amorphous zeolite initiator" means a zeolite initiator that exhibits no detectable crystallinity by x-ray diffraction.

The amorphous zeolite initiator may be prepared by mixing solutions of sodium silicate and sodium aluminate and aging the mixture for a time and at a temperature sufficient to form the amorphous zeolite initiator. Good amorphous zeolite initiators for internal seeding have been made by aging for 24 or more hours at 100° F. For example, good results are obtainable when a sodium silicate solution is added rapidly to a sodium aluminate solution, with rapid mixing, or when the two solutions are simultaneously added to a mixer, with rapid mixing.

When the sodium silicate and sodium aluminate solutions are mixed, the resulting mixture is clear. However, after the mixture is aged at 100° F. for about 24 hours or longer, it begins to acquire a cloudy appearance. In some instances, the mixture comprising zeolite initiator used for internal seeding having such a cloudy appearance performs better because the use of a clear mixture comprising zeolite initiator can result in slower zeolite growth during the crystallization process and a crystallization product having a higher EAI.

In contrast, the mixture containing amorphous zeolite initiator used for external seeding may be clear. The reason for this is that the use of cloudy amorphous zeolite initiator containing mixtures as external seeds can result in a crystallization product having a higher EAI and the formation of excessive fines during the crystallization process.

An advantage of internally seeding with a sodium silicate solution containing an amorphous zeolite initiator is that single solution performs dual functions. In particular, the zeolite initiator functions to assist initiation of the crystallization process and the sodium silicate functions as a binder between the clay particles during and after the spray drying act described below.

The slurry is introduced into spray drier. In the spray drier, the slurry is sprayed to form microspheres. Spray drying forms an imperfect but nevertheless effective active shell coating in situ manner surrounding the substantially inert core. If the properties of the substantially inert core are suitable, subsequent crystallization by the in situ method yields zeolite and active matrix residue confined largely to the active catalyst shell region and comparatively little residual zeolite content or active matrix surface area remaining in the interior substantially inert core.

At least three materials are combined in water to form the slurry; namely the substantially inert core microsheres, and precursors of the zeolite and matrix. In one embodiment, particularly good results are obtained when the solids charged to water to form the slurry contain from about 1 to about 70 parts hydrous kaolin, from about 1 to about 70 parts spinel-form calcined kaolin, from about 1 to about 70 parts mullite kaolin, and from about 1 to about 70 parts substantially inert core microsheres. In another embodiment, the solids charged to water to form the slurry contain from about 5 to about 50 parts hydrous kaolin, from about 5 to about 50 parts spinel-form calcined kaolin, from about 5 to about 50 parts mullite kaolin, and from about 5 to about 50 parts substantially inert core microsheres. In yet another embodiment, the solids charged to water to form the slurry contain from about 10 to about 40 parts hydrous kaolin, from about 10 to about 40 parts spinel-form calcined kaolin, from about 10 to about 40 parts mullite kaolin, and from about 10 to about 40 parts substantially inert core microspheres. Extremely good results are obtained when the solids charged to water to form the slurry contain about 25 parts hydrous kaolin, about 25 parts spinel-form calcined kaolin, about 25 parts mullite kaolin, and about 25 parts substantially inert core microspheres.

The slurry contains a sufficient amount of solids to provide microspheres of desirable size and characteristics. In one embodiment, the slurry contains from about 40% to about 70% solids. In another embodiment, the slurry contains from about 45% to 65% solids.

When calcined clay matrix slurries of minimal high shear viscosity at 50-60% solids are used with a sodium silicate binder content from about 1% to about 10% $SiO_2$ on total kaolin present, then under appropriate conditions the pore volume and attrition resistance of the resultant active shell can be relatively low which maximizes gasoline yields. If the spinel or mullite slurry solids after makedown (or better yet, ISP) are lower, the resulting catalyst pore volume is typically higher. Small amounts of metakaolin can then optionally be substituted into the slurry for hydrous kaolin in order to obtain FCC catalysts having controlled or specified pore volume and attrition resistance properties.

In one embodiment then, little or no metakaolin microspheres are added to the crystallization/slurry, and the resultant FCC catalyst has a relatively high pore volume and moderate attrition resistance in the active shell region. However, this resultant FCC catalyst has relatively high gasoline and low coke yields owing to the reduced diffusion path length compared to conventional FCC catalysts.

In another embodiment, a larger amount (5-15% by weight typically) of metakaolin is added to the crystallization of the core/shell microspheres, resulting in a relatively lower pore volume active shell, however more attrition-resistance than conventional high pore volume FCC catalysts, and equivalent to low pore volume, low opacity prior art catalysts such as those of U.S. Pat. No. 6,696,378 or U.S. Pat. No. 6,716,338. Directionally, the lower pore volume reduces the yield of gasoline, but owing to the core/shell configuration, the gasoline yield of this embodiment is now shown herein superior to U.S. Pat. No. 6,696,378 and comparable to the higher pore volume catalyst of U.S. Pat. No. 6,656,347. The FCC catalysts described herein, however, also have the superior attrition resistance of U.S. Pat. No. 6,696,378, thus, surprisingly, combining the virtues of the two technologies in a way unavailable before.

The microspheres formed in the spray drier may be passed into calciner where they are heated at a temperature and for a time sufficient to convert any hydrous clay, if present, into metakaolin.

Zeolite may be crystallized in the spray dried microspheres by mixing the microspheres with at least water, one or more sources of sodium silicate and, if the microspheres are not internally seeded, optionally with an amorphous zeolite initiator, and heating the resulting mixture to a temperature and for a time sufficient to crystallize the zeolite in the active shell of the microspheres. Sodium hydroxide may be added if it is necessary to raise the $Na_2O$ content of the mixture to obtain good crystallization.

The crystallization mixture may be heated from about 200° F. to about 220° F., typically about 210° F. during crystallization. The length of reaction time, of course, depends on a number of process variables, but typically is between about 10 and 30 hours. After the crystallization process is terminated, the microspheres with zeolite crystallized in the active shell are separated from at least a major portion of their mother liquor. For example, this can be accomplished by filtering, e.g., by a belt filter. In the terminal portion of the belt filter, the microspheres may be contacted with water to wash residual mother liquor from the microspheres and to obtain microspheres that are substantially free of residual mother liquor.

The sodium hydroxide and sodium silicate reactants may be introduced into the crystallization mixture from any suitable source. In one embodiment, portions of the sodium silicate are provided by mother liquor recycled, in a concentrated form, produced during the crystallization reaction of another zeolite product, e.g., the concentrated mother liquor by-product produced during the manufacture of another catalyst.

After the crystallization reaction product is filtered from its mother liquor in belt filter, the next act in the process depends on whether or not it is desired to reduce the micropore volume of the microspheres by silica retention and, if so, to what degree it is to be reduced. Silica retention, when it is desired, may be accomplished by either of two alternative processes.

In the first alternative, the microspheres with zeolite crystallized in the active shell are separated from the zeolite crystallization mother liquor so that a portion of the mother liquor is left entrained within the microspheres. This may be accomplished simply by filtering the microspheres in the belt filter, without washing the microspheres with water. The microspheres are then dried, leaving a portion of the mother liquor (including sodium silicate) in them.

In the second alternative, the microspheres separated in belt filter are introduced into a silicate contactor where they are contacted with a sodium silicate solution, e.g., a solution containing about 20% by weight sodium silicate. In one embodiment, contacting takes place by moving the sodium silicate solution through a bed of microspheres. Next, the microspheres are dried leaving a portion of the sodium silicate in them. In both alternatives, drying is preferably conducted in flash drier, at an air inlet temperature above about 800° F.

The microspheres that are filtered in belt filter contain zeolite Y in the sodium form. Typically, the microspheres contain more than about 5% by weight $Na_2O$. In one embodiment, to prepare the FCC catalysts, a substantial portion of the sodium ions in the microspheres are replaced by ammonium or rare earth ions or both in ion exchanger.

Ion exchange may be conducted by a number of different ion exchange methods. In one embodiment, the microspheres are first exchanged one or more times with an ammonium nitrate solution at a pH from about 2.7 to about 7. The ion exchange(s) with ammonium ions may be followed by one or more ion exchanges with rare earth ions at a pH from about 2.7 to about 7. The rare earth may be provided as a single rare earth material or as a mixture of rare earth materials. In one embodiment, the rare earth is provided in the form of nitrates or chlorides. In one embodiment, the FCC catalysts may be ion exchanged to contain at least about 0% by weight REO and less than about 0.7% by weight $Na_2O$. In another embodiment, the FCC catalysts may be ion exchanged to contain at least about 0.5% by weight REO and less than about 0.5% by weight $Na_2O$. In yet another embodiment, the FCC catalysts may be ion exchanged to contain at least about 1% by weight REO and less than about 0.25% by weight $Na_2O$.

After ion exchange is completed, the FCC catalyst microspheres containing an active shell and substantially inert core may be filtered and dried. The complete exchanged process includes one or more intermediate calcination acts. The general process set forth in U.S. Pat. Nos. 4,493,902; 5,082,814; 6,656,347; 6,673,235; 6,696,378; and 6,716,338, which are hereby incorporated by reference, may be employed to make the FCC catalysts, except that a substantially inert core microsphere is added to the slurry that is spray dried.

Many factors affect gasoline and other yields from FCC catalysts, including the relative amount of matrix activity. Increasing matrix activity generally tends to increase the LCO/Bottoms yield ratio and sometimes increases gasoline or coke yields. The matrix activity may be increased by either increasing the proportion of spinel-form kaolin versus mullite-form kaolin, or by decreasing the crystallinity of the mullite within a proportion of kaolin calcined through the exotherm, or in general, adding a larger proportion of these or other matrix precursors. When the zeolite content and stability of the novel FCC catalyst are present to the desired extent, using the 25 parts spinel calcined kaolin and 25 parts mullite with 25 parts of substantially inert core charged to water to form a slurry provides a desirable steamed zeolite/matrix surface area.

In another embodiment, a metals-tolerance function is provided over and above the kaolin-only conventional FFC catalyst formulations. U.S. Pat. No. 6,673,235, FCC catalysts for feeds containing nickel and vanadium, provides a macroporous catalyst with zeolite freely coating the walls which contains metals-passivating alumina, but the properties of the microspheres are spatially uniform and random. The FCC catalyst described herein is an improvement wherein the properties of the catalyst described in U.S. Pat. No. 6,673,235 are reproduced in the shell region, but the center of the microsphere is an inert or low activity core. The attrition resistance of the FCC catalyst of this embodiment is conventional and equivalent to U.S. Pat. No. 6,673,235, but the gasoline and other yields are superior. Optionally, the Ni tolerance can be improved over the '235 patent by placing the full compliment of the alumina in the '235 catalyst soley in the shell of the present invention. The increased alumina concentration improves Ni tolerance at no additional cost for the alumina.

In yet another embodiment, there is provided an FCC catalyst having metals tolerance and the superior attrition resistance needed for low stack opacity applications, but now with cracking yields improved over conventional attrition-resistant, low opacity FCC catalysts. In this embodiment, the FCC catalyst may be obtained by adding a substantially inert core to the catalyst of either U.S. Pat. No. 6,716,338, or to U.S. Pat. No. 6,673,235 if additional metakaolin microspheres are added to the crystallization in this latter case. U.S. Pat. No. 6,716,338 provides a metal tolerant catalyst without macroporosity or zeolite freely coating the walls. Gasoline yields of the FCC catalyst of '338 are reduced with respect to U.S. Pat. No. 6,673,235, however, attrition resistance and stack opacity is superior. The FCC catalyst made by adding a substantially inert core to U.S. Pat. No. 6,716,338 as the shell material has the same superior attrition resistance, but gasoline yields are increased and comparable to U.S. Pat. No. 6,673,235, owing to the novel core/shell morphology. If U.S. Pat. No. 6,673,235 is used as the shell material, superior attrition resistance can be obtained if supplemental metakaolin microspheres are added during crystallization to form the FCC catalyst of the invention. As in the other cases, this increases the limiting reagent alumina available during crystallization, which increases zeolite yield, reduces pore volume, and improves attrition resistance. Some acceptable sacrifice is made on cracking yields with respect to the FCC catalysts of this embodiment with no supplemental metakaolin, but the yields are comparable to those of U.S. Pat. No. 6,673,235 and superior to those of U.S. Pat. No. 6,716,338.

Further benefits of the invention are obtainable by inserting substantially inert cores in only the coarsest fractions of the full particle size distribution of a conventional FCC catalyst. The finer particles already have reduced diffusion path length. Placing inert cores, for example, inside conventional FCC catalyst with diameters greater than 100 microns has a disproportionate effect on selectivity while causing a more modest activity dilution.

Although the in situ preparation process is typically most efficient, it is possible to prepare FCC catalysts with the active shell and substantially inert core using an incorporation process. In this case, the substantially inert core material is added with zeolite powder, kaolin, optionally a granular alumina, and an inorganic binder, which are then spray dried in conventional manner. The binder may be prinicipally silica, or an ionic, colloidal, or peptizable pseudo boehmite alumina. Practical considerations and economic pressures drives a compromise between the reduction in diffusion path length and the dilution of activity. In the incorporated case however, there is in some instances the ability to increase the level of zeolite and cracking activity in the active shell. Attrition resistance and opacity performance may suffer if too much zeolite is incorporated, but some of the known binders are very effective. Another approach to making the FCC catalysts described herein is to formulate with reduced steamed surface area but higher rare earth, or at the same rare earth but at a higher replacement rate in the refinery. Either of these options increase the activity of the FCC catalyst.

The FCC catalyst described herein possess one or more, two or more, three or more, or even four or more of the following properties: pore volume distribution, total pore volume, average particle size, average substantially inert core size, average active shell thickness, particle surface area, core surface area, zeolite stability, and core coverage (including properties mentioned above including substantially inert core surface area, heating/calcining temperatures, relative amounts of components, and % volume of shell/core). In one embodiment, the FCC catalyst possesses a characteristic within at least one range of all of the properties described in the preceding sentence. The properties are selected depending on a number of factors including the specific nature of the feed being cracked, the desired products of the cracking process, and the operating constraints of the cracking process.

In one embodiment, the FCC catalyst has a pore volume distribution wherein a first set of pores containing a porosity from about 0.03 to about 0.13 ml/g have a pore diameter of at least about 40 Å and at most about 100 Å, a second set of pores containing a porosity from about 0.03 to about 0.19 ml/g have a pore diameter of at least about 100 Å and at most about 600 Å, and a third set of pores containing a porosity from about 0.001 to about 0.24 ml/g have a pore diameter of at least about 600 Å and at most about 20,000 Å (Hg intrusion porosimetry, such as using a Micromeritics model AutoPore-II 9220 porosimeter in accordance with the analysis method outlined in one or more of U.S. Pat. Nos. 5,186,746; 5,316, 576; and 5,591,256). In another embodiment, the FCC catalyst has a pore volume distribution wherein a first set of pores containing a porosity from about 0.04 to about 0.12 ml/g have a pore diameter of at least about 40 Å and at most about 100 Å, a second set of pores containing a porosity from about 0.04 to about 0.18 ml/g have a pore diameter of at least about 100 Å and at most about 600 Å, and a third set of pores containing a porosity from about 0.02 to about 0.2 ml/g have a pore diameter of at least about 600 Å and at most about 20,000 Å.

In one embodiment, the FCC catalyst has a total porosity from about 0.15 to about 0.5 ml/g contained in pores of at least about 40 Å and at most about 20,000 Å in diameter. In another embodiment, the FCC catalyst has a total porosity from about 0.175 to about 0.45 ml/g.

In one embodiment, FCC catalysts having a relatively low pore volume have a total porosity less than about 0.25 ml/g while FCC catalysts having a relatively high pore volume have a total porosity greater than about 0.25 ml/g. In another embodiment, FCC catalysts having a relatively low pore volume have a first set of pores containing a porosity from about 0.05 to about 0.13 ml/g have a pore diameter of at least about 40 Å and at most about 100 Å, a second set of pores containing a porosity from about 0.03 to about 0.11 ml/g have a pore diameter of at least about 100 Å and at most about 600 Å, and a third set of pores containing a porosity from about 0.05 to about 0.001 ml/g have a pore diameter of at least about 600 Å and at most about 20,000 Å while FCC catalysts having a relatively high pore volume have a first set of pores containing a porosity from about 0.04 to about 0.12 ml/g have a pore diameter of at least about 40 Å and at most about 100 Å, a second set of pores containing a porosity from about 0.1 to about 0.18 ml/g have a pore diameter of at least about 100 Å and at most about 600 Å, and a third set of pores containing a porosity from about 0.15 to about 0.21 ml/g have a pore diameter of at least about 600 Å and at most about 20,000 Å.

In one embodiment, the FCC catalyst has an overall average particle size from about 50 to about 100 microns. In another embodiment, the FCC catalyst has an overall average particle size from about 60 to about 90 microns. In yet another embodiment, the FCC catalyst has an overall average particle size from about 70 to about 85 microns. In still yet another embodiment, the FCC catalyst has an overall average particle size from about 75 to about 82 microns.

The overall FCC catalyst particle size and the relative size of the substantially inert core and active shell thickness are selected based on the specific demands of a target FCC process. For example, generally speaking, the larger the substantially inert core, a higher resultant selectivity is achieved mainly due to decreased diffusion path length (high selectivity referring to increased yield of desired cracking products gasoline/polypropylene while minimizing or decreasing the yield of undesired cracking products such as coke/gas). In contrast, generally speaking, the larger the active shell thickness, a higher activity is achieved mainly due increased amounts of active catalyst.

In one embodiment, the substantially inert core has an average particle size from about 30 to about 60 microns. In another embodiment, the substantially inert core has an average particle size from about 35 to about 55 microns. In yet another embodiment, the substantially inert core has an average particle size from about 40 to about 50 microns. In still yet another embodiment, the substantially inert core has an average particle size from about 42 to about 48 microns.

In one embodiment, the active shell has an average thickness (measured from the outer surface of the substantially inert core to the outer surface of the FCC catalyst particle) from about 5 to about 30 microns. In another the active shell has an average thickness from about 7 to about 25 microns. In another the active shell has an average thickness from about 10 to about 20 microns. In another the active shell has an average thickness from about 12 to about 18 microns. In another embodiment, at least 90% by weight of the FCC catalyst particles have an active shell thickness within in the four cascading ranges provided above.

It is not necessary that every square micron of the substantially inert core surface is covered by the active shell. In one embodiment, the active shell covers or surrounds at least about 60% of the substantially inert core surface. In another embodiment, the active shell covers or surrounds at least about 75% of the substantially inert core surface. In yet another embodiment, the active shell covers or surrounds at least about 90% of the substantially inert core surface. In still yet another embodiment, the active shell covers or surrounds substantially all of the substantially inert core surface.

The invention must have sufficient surface area to provide the activity needed to compete in the marketplace. In one embodiment, the fresh FCC catalyst has a surface area of at least about 100 $m^2/g$, such as from about 100 to about 450 $m^2/g$. In another embodiment, the FCC catalyst has a surface area of at least about 180 $m^2/g$, such as from about 180 to about 380 $m^2/g$. In another embodiment, the FCC catalyst has a surface area of at least about 180 $m^2/g$ for catalysts of the invention made by the incorporation route, and such as from about 300 to about 400 $m^2/g$ for the invention when prepared by the in situ route.

One way to improve the economics of the invention is to exhibit improved zeolite stability compared to the relevant prior art FCC catalysts. To measure zeolite stability, a standardized steaming test in a fluidized bed steamer using 100% steam at 1 atm total pressure and at 1500° F. for a duration of four hours is conducted, and the steamed zeolite surface area (micropore area) is compared to that in the original sodium form of the catalyst. Commonly, conventional in situ FCC catalysts are only able to maintain about 35-40% of the original NaY zeolite surface area through standardized steaming. In contrast, in one embodiment, the FCC catalyst described herein maintains at least about 45% of its original NaY zeolite surface area through standardized steaming. In another embodiment, the FCC catalyst maintains at least about 48%, such as from about 48% to about 55%, of its original NaY zeolite surface area through standardized steaming. In yet another embodiment, the FCC catalyst maintains at least about 52% of its original NaY zeolite surface area through standardized steaming. The FCC catalyst described herein typically contains a reduced amount of original NaY zeolite as compared to conventional in situ FCC catalysts, mainly owing to dilution by the core, which reduced amount of zeolite is advantageously compensated for if possible by an improved maintenance of NaY zeolite surface area in standardized steaming, such that the resulting steamed zeolite and matrix surface areas for the FCC catalyst described herein are equivalent to conventional in situ FCC catalysts containing a normally higher amount of original NaY zeolite in actual commercial practice.

Fluid Catalytic Cracking (FCC) is the preferred refining process for converting higher boiling petroleum fractions into lower boiling products, such as gasoline, cracked naphtha and light olefins such as polypropylene. The FCC catalyst described herein is in the form of fine particles acts like a fluid and circulates in a closed cycle between a cracking reactor and a separate regenerator.

Generally, an FCC process involves contacting at least one hydrocarbon feedstream with the FCC catalyst described herein under effective catalytic reaction conditions to produce cracked products. An exemplary cracking process involves contacting at least one hydrocarbon feedstream and the FCC catalyst described herein in an FCC reactor and applying suitable heat to the reactor. Cracked products are then recovered. Typical temperatures at which the reactor is heated include from about 300 to about 800° C. In another embodiment, the reactor is heated include from about 400 to about 700° C.

The hydrocarbon feedstream typically contains hydrocarbonaceous oils, such as those that boil from about 200 to about 700° C. Examples of hydrocarbon feedstream components include one or more of gas oil, steam cracked gas oil and residues, heavy and reduced petroleum crude oil, petroleum atmospheric distillation bottoms, petroleum vacuum distillation bottoms, pitch, asphalt, bitumen, other heavy hydrocarbon residues, tar sand oils, shale oil, liquid products derived from coal liquefaction processes, Fischer-Tropsch liquids, gasoline, distillate, virgin naphtha and the like. Examples of cracked products from the cracking process described herein include one or more of hydrogen, light olefins (less than 5 carbon atoms), light paraffins, and olefins and paraffins having more than five carbon atoms, cracked naphtha, cracked gas oil, and coke. Cracked products can be liquid and/or gaseous.

Various advantages can be obtained as a result of the FCC catalysts described herein. For example, the FCC catalysts may increase conversion to cracked products like gasoline and propylene in FCC units which are constrained to use FCC catalysts giving low fines generation and stack opacity. The FCC catalysts may increase conversion to cracked products like gasoline and propylene in conventional FCC units not especially restricted by opacity limitations, without further increasing stack opacity and catalyst losses. The FCC catalysts may reduce the catalyst losses due to abrasion, and/or reduce air grid plugging or compressor blade fouling due to catalyst fines in FCC applications, while maintaining high conversion to gasoline and propylene. Furthermore, the above advantages may be achieved while the FCC catalysts simultaneously possess a contaminant metals passivation function. And further still, the above advantages may optionally be achieved while the FCC catalysts simultaneously retain steamed surface area and equilibrium activity comparable to conventional FCC catalysts. Yet another advantage is that the FCC catalysts may improve the cracking conversion and yields for incorporated FCC catalysts in addition to in situ formed FCC catalysts when added as only a portion of the fresh catalyst additions to the FCC unit.

Consequently, also provided herein in connection with the cracking processes are methods of simultaneously increasing/improving conversion of feedstreams to cracked products while decreasing the generation of fines and improving stack opacity; methods of simultaneously increasing/improving conversion of feedstreams to cracked products while increasing/improving attrition resistance.

EXAMPLES

The following examples illustrate the subject invention. Unless otherwise indicated in the following examples and elsewhere in the specification and claims, all parts and percentages are by weight, all temperatures are in degrees Centigrade, and pressure is at or near atmospheric pressure.

Samples representative of the FCC catalysts described herein have been prepared and analyzed by roller attrition testing and ACE™ fixed fluidized bed cracking tests. Prior art in situ FCC catalysts (Structurally Enhanced and conventional in situ) were prepared side by side wherein the zeolite stability and attrition resistance of the comparative samples were representative of the state of the prior art. The FCC catalysts described herein contained 25% of substantially inert core before crystallization and so their surface areas as fresh or steamed catalysts would ordinarily be reduced. For reasons that are presently not well understood, the samples of the FCC catalysts described herein had improved zeolite stability sufficient to overcome the dilution effect due to the core. The samples of the FCC catalysts described herein are therefore economically viable because they do not reduce the ability to meet industry demand for FCC catalyst. It is surprising that samples of the FCC catalysts described were prepared having the qualities of: improved attrition resistance and yields, and conventional surface areas and cracking activity. The examples and associated figures demonstrate the results.

Example 1

Microsphere Precursor of the Invention

A microsphere was prepared (20, 257-38) containing 25 parts of LHT hydrous kaolin, 25 parts of Ansilex 93™ spinel-form calcined kaolin, 25 parts of M-93 mullite-form calcined kaolin powder, and 25 parts of mullite-form kaolin core microspheres. To this mixture of hydrous and calcined kaolins was added 2.56 parts of $SiO_2$ added from N-brand™ sodium silicate. The hydrous kaolin source was a 60% solids slurry of LHT, a coarse co-product of the centrifuging of a so-called grey kaolin clay for 90% by weight of particles less than 1 micron in size.

The Ansilex-93™[A-93] pigment and M-93 were calcined commercially in a rotary calciner. Typically the A-93 mullite content by X-ray diffraction is <5%, but this sample measured as 12%. The M-93 mullite content was 38% on the kiln product. A-93 and M-93 were made down separately using a electrically-driven heavy duty Cowles mixer in a batch process where the dry calcined kaolin was added to the water that already contained Colloid 211 surfactant. The kaolin was added more slowly to the water as the mixture thickened. A very dilatant slurry was formed but continued mixing reduced the viscosity. Gradual addition of the calcined kaolin and continued mixing during 45 minutes or more led to 50% solids slurries for which the dilatancy was no longer apparent by casual inspection. Small samples were dried for ISP and TBD measurements. The increase in TBD after makedown at 50% solids and drying may be due in part to the work done on the starting material during make-down, or more likely to incomplete pulverization of the dried product, but the ISP of the dried kaolins from the 50% solids slurry were still in an acceptable range.

The core material was prepared by screening commercially prepared calcined kaolin microspheres (APS=75-80 um) below a 230 mesh sieve. This product was calcined at 2400° F. for four hours in cordierite trays to obtain maximal yield of well-crystallized mullite, and then crushed and sieved again below 230 mesh. The average particle size of the core material was 44 microns, the bulk density was 0.86 g/ml and the mullite content was 55%. The bulk density of the core is much larger than the A-93 and M-93 powders, indicating far lower pore volume.

The slurry for spray drying was formed by mixing the three component slurries and dry core in the 25:25:25:25 dry basis ratio using a 4 kg overall dry basis, as noted above, in an air-driven Cowles mixer. Directly to this slurry was to be added 0.857 kg of N-brand sodium silicate for a target of 6% $SiO_2$ binder. During the silicate addition, the slurry thickened and required the addition of 2 kg more of water. A large fraction of the intended sodium silicate was accidentally spilled so the actual binder content was determined later by sodium analysis to be 2.56 g $SiO_2$ per 100 g of kaolins. The final mixture was marginally pumpable and was spray dried using a #10 nozzle on a Stork-Bowen 3 ft diameter spray drier with air atomization pressure of 70 psi. At one point the nozzle was plugged up but a yield of 1.86 kg of grade product and 0.32 kg of fines were produced.

The as-sprayed material had a 0.68 gm/ml ABD (apparent bulk density) and analyzed with 1.35% $Na_2O$ and a 79 micron APS. This product was acid-neutralized by feeding the as spray dried microspheres to a bucket of cool stirred tap water, while co-feeding sufficient 40 Wt. % $H_2SO_4$ to keep the pH of the slurry between about 2.5 and 4. After all of the solids were added, the pH was monitored and controlled for 10 minutes before filtering and washing with tap water, and then dried overnight at about 250° F.

The acid-neutralized microspheres were calcined two hours at 1150° F. and then 2 hours at 1400° F. in preheated furnace using open cordierite trays during four hours. The product contained 21% mullite by X-ray diffraction, had 9.35% acid solubles, 0.577 cc/gm pore volume in the 40-20,000 range by mercury porosimetry, a 90 micron APS by Microtrac, and a 0.68 gm/cc ABD.

Example 2

Core/Shell Catalysts with Poor Shell Quality

Prior to the Successful Spray Drying Described in Example 1, Multiple attempts had been made using the same composition but different nozzle sizes and atomizer air pressures, in order to obtain an appropriate average particle size. Some of the runs gave finer APS and some of the runs yielded coarser spray dried APS than desired. These off spec runs were combined into a spray drying composite to be used for zeolite crystallization and stability studies, and as an example of poor shell uniformity and morphology, and potentially poor in performance.

The acid-neutralized microspheres were calcined four hours at 1400° F. in preheated furnace using open cordierite trays during four hours. The product contained 25% mullite by X-ray diffraction, had 8.3% acid solubles, 0.398 cc/gm pore volume in the 40-20,000 range by mercury porosimetry, a 73 micron APS by Microtrac, and a 0.75 gm/cc ABD.

Examples 3-5 Crystallization

The microspheres of Examples 1 and 2 were then crystallized in the laboratory using N-brand sodium silicate using the process described in Examples 4-6 of U.S. Pat. No. 6,656,347 and the seeds of U.S. Pat. No. 4,631,262. Two crystallizations were run on the Invention of Example 1, the first with no supplemental metakaolin microspheres (MS-2; Example 3) and the second with 7.5% of the microspheres used being MS-2 metakaolin. The use of the MS-2 increases the available amount of limiting reagent reactive alumina, and therefore increases the theoretical stoichiometric yield of NaY zeolite (U.S. Pat. No. 6,656,347). 7.5% of MS-2 was also used in the crystallization of the Example 2 Composite.

The crystallizations gave about 50% NaY yield, close to the theoretical value, in 20-24 h. After washing with water, surface areas, unit cell size (UCS), laser particle size, Roller attrition loss testing, and pore size distribution by mercury intrusion were obtained. It is seen that without MS-2 addition, the attrition resistance of the invention was at the upper limit of acceptable for conventional FCC service (14 wt %/h target), but that the same spray dried microsphere could be crystallized with supplemental metakaolin to obtain an attrition-resistant catalyst suitable for low opacity FCC service (<8 wt %/h target). Two embodiments are thus usefully obtained with one basic feedstock microsphere.

Upon further review, the initial Hg total pore volume of 0.332 ml/g that we obtained seemed surprisingly high for a sample with such a low roller attrition rate. The original sample was retested and the result was 0.262 ml/g, which still seems to be surprisingly high. This calls into doubt the validity of the roller attrition number, but the 6 wt %/h result originally obtained was well in line with expectations from the many crystallizations ran with 7.5% MS2. The composite sample Example 4 has this same roller value at 7.5% MS2 for example. Sufficient sodium form of Example 3 was not available to re-run the roller test so the finished product 2×2 was tested in duplicate, with results of 5 and 4 wt %/h, validating the original roller test results. FIG. 1 depicts Table 2 showing Cystallization data.

Example 5

Microsphere for High Porosity Comparative Catalyst

For the present Example 5, microspheres were spray dried commercially according to Example 11 of U.S. Pat. No. 6,656,347.

Example 6

Microsphere for Low Porosity Comparative Catalyst

For the present Example 6, microspheres were spray dried commercially in accordance with U.S. Pat. No. 6,696,378.

Examples 7 and 8

Crystallization of the Comparative Catalysts

The microspheres of Examples 5 and 6 were crystallized in the laboratory using the concentrated sodium di-silicate mother liquor recycle stream (SDS) taken from the processes described therein. The crystallization ratios and data for the resulting product are given in Table 3 of FIG. 2. Two crystallizations were run on the microsphere precursor for the high pore volume Comparative catalyst (Example 5), the first with 10% supplemental metakaolin microspheres (MS-2; Example 7) and the second with 15% of the microspheres used being MS-2 metakaolin. 7.5% of MS-2 was also used in the crystallization on the microsphere precursor for the low pore volume Comparative catalyst (Example 6).

The crystallizations gave about 64-68% NaY yield according to surface area, close to the theoretical value, in about 21 h. After washing with water, properties were obtained. The attrition resistance of the high and low pore volume Comparative catalysts were brought into the range found for the Invention by the MS-2 addition, with the Roller attrition loss for the low pore volume Invention and Comparative catalysts being equal.

Examples 9-11

Exchange and Steaming of the Invention

The sodium-form catalysts of Examples 2-4 were then ion-exchanged to finished products as follows. Sodium-form catalyst was added to 27 wt. % ammonium nitrate solution at 180° F. and pH of 2.8-3.2 while stirring and adding 50% $HNO_3$ drop-wise to control pH. After all of the catalyst was added, the slurry was stirred for 15 minutes, filtered, and the cake washed with twice the dry catalyst weight of de-ionized water. Two such exchanges were done where the weight ratio of catalyst to 27 wt. % ammonium nitrate was 1:2. The samples were then rare earth exchanged at 180° F. and pH of 4 to ultimately yield about 2.25% REO on the final catalyst.

The partially-exchanged materials were dried and then calcined for two hours using covered silica trays while initially containing 25 Wt. % moisture, and using preheated furnaces intended to operate at 1150° F. A problem with the temperature controller led to a final temperature over 1400° F. however. After calcination, "1×1" properties were collected and are reported in Table 3. Using the 1×1 samples, the ammonium exchange procedure was repeated three times (Examples 9-11) times and the samples were then calcined again at 25% moisture and 1150° F. to form the finished "2×2" product. Finished products were then steamed in 100% steam for four hours at 1500° F. The results are as follows:

FIG. 3 depicts Table 3 showing exchange and steaming data of the FCC catalysts of the invention. The pore volumes on the catalyst of the invention (Example 10) that we initially obtained were surprisingly high for materials with such good sodium-form attrition resistance (than Example 3). As noted above, the discrepancy leads to re-testing the Hg PV of Example 10 and the second test gave 0.296 ml/g total pore volume, which is still surprisingly high for such a low attrition rate. Subsequent testing of the Example 10 finished product for roller attrition then gave 4 and then 5 wt %/h, essentially the same as the 6 wt %/h of the sodium form. The low opacity/good attrition properties for the Invention in the lower pore volume embodiment are thus confirmed, even though the pore volume itself was surprisingly high.

Upon steaming we found excellent steamed surface areas for Examples 9 and 10, considering the relatively low starting zeolite content of these materials. For reasons that are not understood, the Composite of off spec materials (and many other samples) gave poorer zeolite stability and poor steamed surface area as compared to the high activity prior art. On the other hand, the steamed surface area of 180 $m^2/g$ is still well in excess of that obtained for incorporated catalysts (typically <150 $m^2/g$).

SEM/EDS elemental mapping was run on a rare earth exchanged version of Example 2 crystallization with no MS-2. The core materials had a greater intensity in the backscatter electron image due to the high density of the core. The core is high in alumina and usually lower in silica, reflecting the mullite composition 3 $Al_2O_3$: 2 $SiO_2$. The morphology was by no means perfect but most of the cores were single and roughly in the center of the microsphere and coated on all sides. It is possible that some of the spheres could have been sectioned above or below the core, so that if a core were in fact present, they still did not show in the pictures.

SEM/EDS elemental mapping was also run on a rare earth exchanged version of Example 5 crystallization with 7.5% MS-2 (Composite). The core materials had greater intensity in the backscatter electron image due to the high density of the core. Poor shell uniformity was evident in that many microspheres had multiple cores and thin shells. Example 10 is a low pore volume (LPV) prototype of the invention having roller attrition (6) equivalent to the conventional in situ Example 17 (roller=6) that represents a low opacity level in the refinery. The yields are dramatically improved without any compromise in attrition. The degree of the improvement is surprising.

Example 9 is a higher pore volume (HPV) prototype of the invention with a higher rate of attrition (21) in the roller test. These yields are also dramatically improved over the low pore volume in situ control. Although the sample is higher in roller attrition than we might have desired, there is no benefit apparent over the lower pore volume Example 10 or the two prior art Examples 15 and 16 (DMS/SECC) with lower attrition rates. Despite the test results, it is believed that the true yields of this sample would be better in a riser cracking environment, and that the ACE test as ran here is not sufficiently severe to demonstrate the differences that would ultimately be found in the riser.

Examples 12-14

Steamed Composite at Target Surface Area

Hypothesizing that a mass transfer limitation exists then any samples having lower catalyst activity and surface area will hypothetically have improved selectivity as a result. Thus performance testing of Example 11 against higher surface area Examples 9 and 10 or higher activity prior art samples would give a built in bias in Example 11's favor. To eliminate this testing bias the remaining samples from Example 4 that were similar to Example 11 were combined and further exchanged them to 0.11 wt % Na2O to improve hydrothermal stability. This still turned out to be insufficient in steam stability and so three shortened steamings were run at 1500° F., showing that a 90 min steaming could yield a steamed surface area and unit cell size close to Examples 9 and 10. This sample is more suitable for assessing the effect of shell morphology on yields.

Examples 15-17

Exchange and Steaming of the Comparative Catalysts

The sodium-form catalysts of Examples 7-9 were ion-exchanged and calcined to finished products in ways similar to the previous Examples. The rare earth target was higher considering the higher level of starting zeolite, which adjustment attempts to keep the rare earth on zeolite level constant. Calcinations were run at 1150° F. in covered trays with 25% moisture for 2 hours. The two high pore volume catalysts were processed to 2×2 products having a second calcination, but the low pore volume product was processed to a 2×1 product without the final calcination.

The Hg pore volume of the high pore volume comparative Example 16 was surprisingly high for such a low roller attrition as well and suspiciously close to Example 15. A search has been conducted for remaining sample to have tested again, but meanwhile a lower rare earth product made earlier but with the same crystallization recipe gave a similar pore volume.

Finished catalyst products were then steamed in 100% steam for four hours at 1500° F. The results are as follow in Table 4 as depicted in FIG. 4.

These commercially-produced microspheres were grown and processed under plant conditions in the laboratory, and gave representative properties for the prior art. Steamed surface areas are in excess of 220 m$^2$/g. Of the two comparative Example 15 and 16 (DMS/SECC) samples, the sample with the lower attrition rate (9) gave much better yields. This ranking is contrary to expectations and is believed to be a spurious result. Another sample had given yields similar to Example 15, but the Example 16 results are reported for completeness. The improvement over conventional in situ however can nevertheless be taken as correct however.

Examples 18-23

Catalytic performance was determined using an ACE™ microscale fixed fluidized bed unit operating at a superficial 8 WHSV and 1000° F. using 9 grams of catalyst and a gas oil feed [Feed A of Table 5 in U.S. Pat. No. 6,656,347], substantially as described in U.S. Pat. No. 6,069,012, with the 2.125" injector position. The patent suggests this injector position corresponds to a 2-2.5 sec riser residence time. The catalyst strip time was held constant at 575 sec. The catalysts of Examples 9, 10, 14-17 were diluted with activity-adjusting microspheres as disclosed by Brown et al. in U.S. Pat. No. 4,943,902. However, in order to remain faithful to the teachings of U.S. Pat. No. 6,069,012 and conventional reaction engineering, it is clear that different catalysts should be evaluated at constant bed volume. This ensures that the height of the catalyst bed above the feed injection point is constant in the comparisons. In an effort to do this, these catalyst formulations were blended to equal ABD and tested at constant weight. This is done by using appropriate amounts of the activity-adjusting microspheres cited by Brown (ca. 0.98 ABD), and acid-neutralized and steamed kaolin microspheres having of ABD=0.63.

The catalytic results are as follows. In summary, primary cracking product selectivities have been improved using the catalysts of the invention over the LPV Comparative catalyst Example 17; however, the lower pore volume, lower opacity catalyst of the Invention (Example 10, Roller=5 or 6 wt %/h) have done this at the same attrition resistance as the LPV Comparative Example 17. Thus these catalysts show the unusual and desirable traits of higher gasoline selectivity at constant attrition rate, stack opacity, steamed activity and unit cell size. Higher LCO selectivity at constant conversion is observed, which might be explained by the marginally lower steamed ZSA/MSA, as is known, but surprisingly we simultaneously find lower coke selectivity, in spite of the higher matrix activity of the Invention. Prior to the catalysts of the invention and U.S. Pat. No. 6,656,347, such performance characteristics normally had to be traded off one against another.

Figure 6:
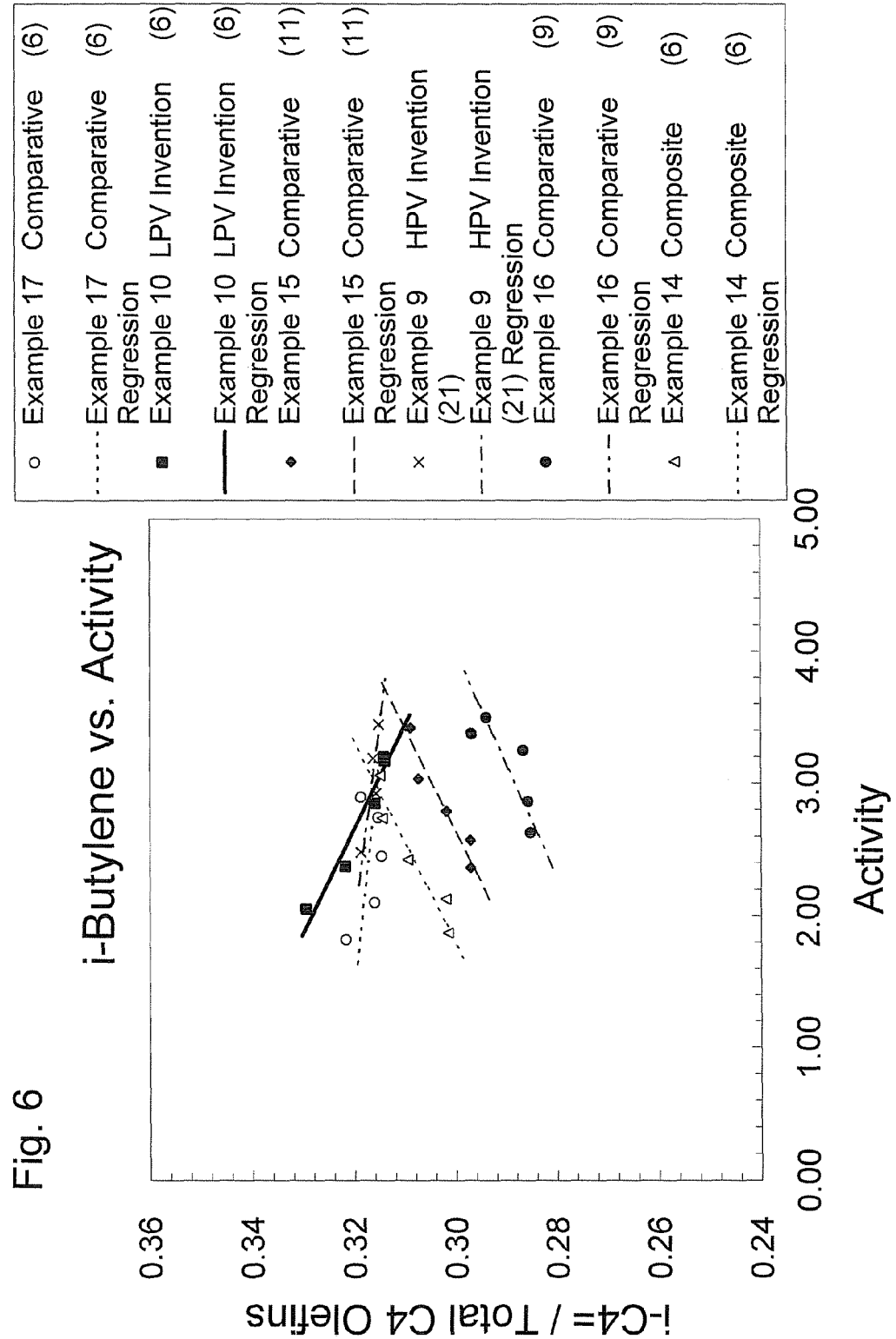
FIG. 6 is graph reporting experimental data indicating the relationship between activity and the fractional amount of iso-C4 olefins versus total C4 olefins.
Figure 7:
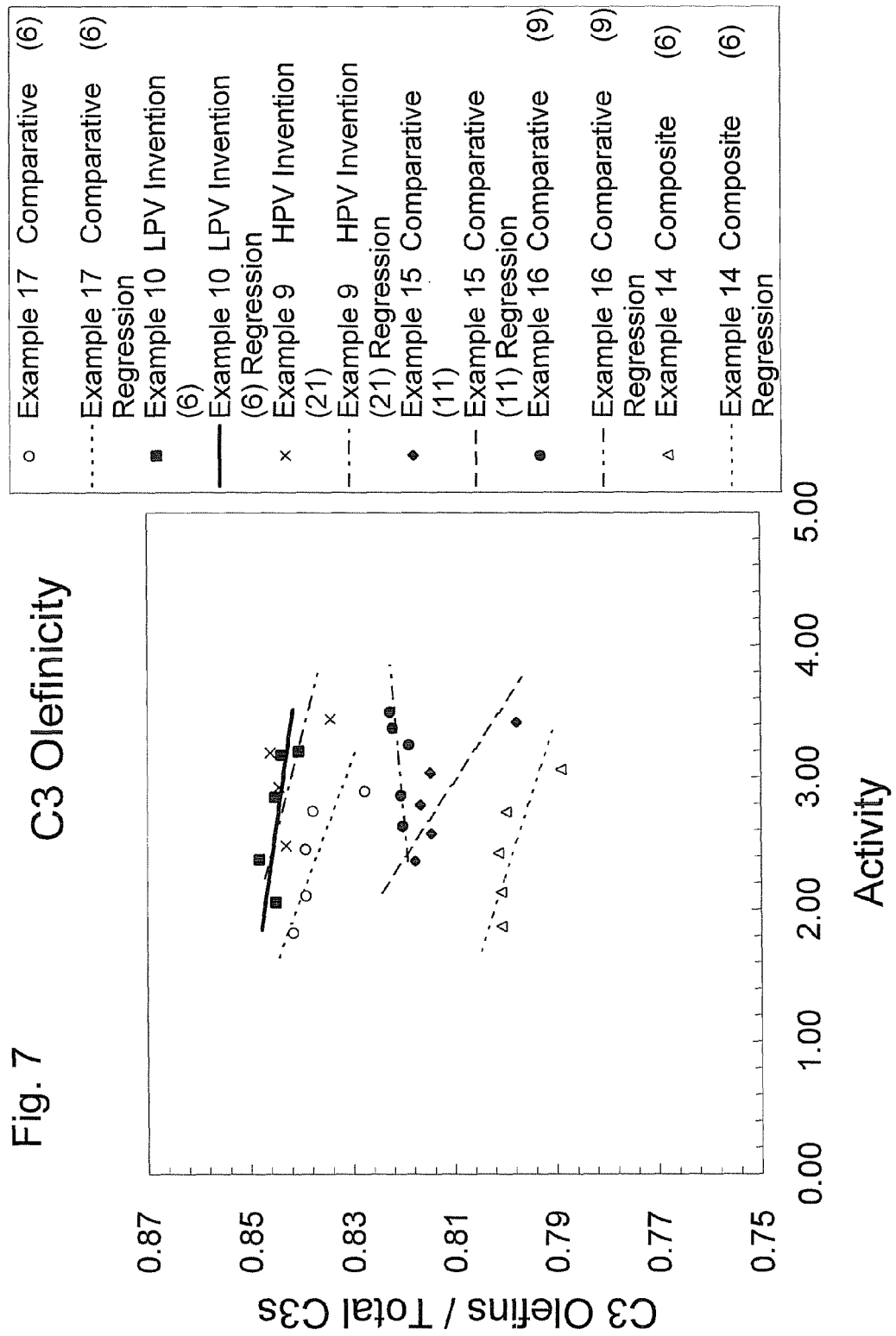
FIG. 7 is graph reporting experimental data indicating the relationship between activity and the fractional amount of C3 olefins versus total C3 compounds.
Figure 8:
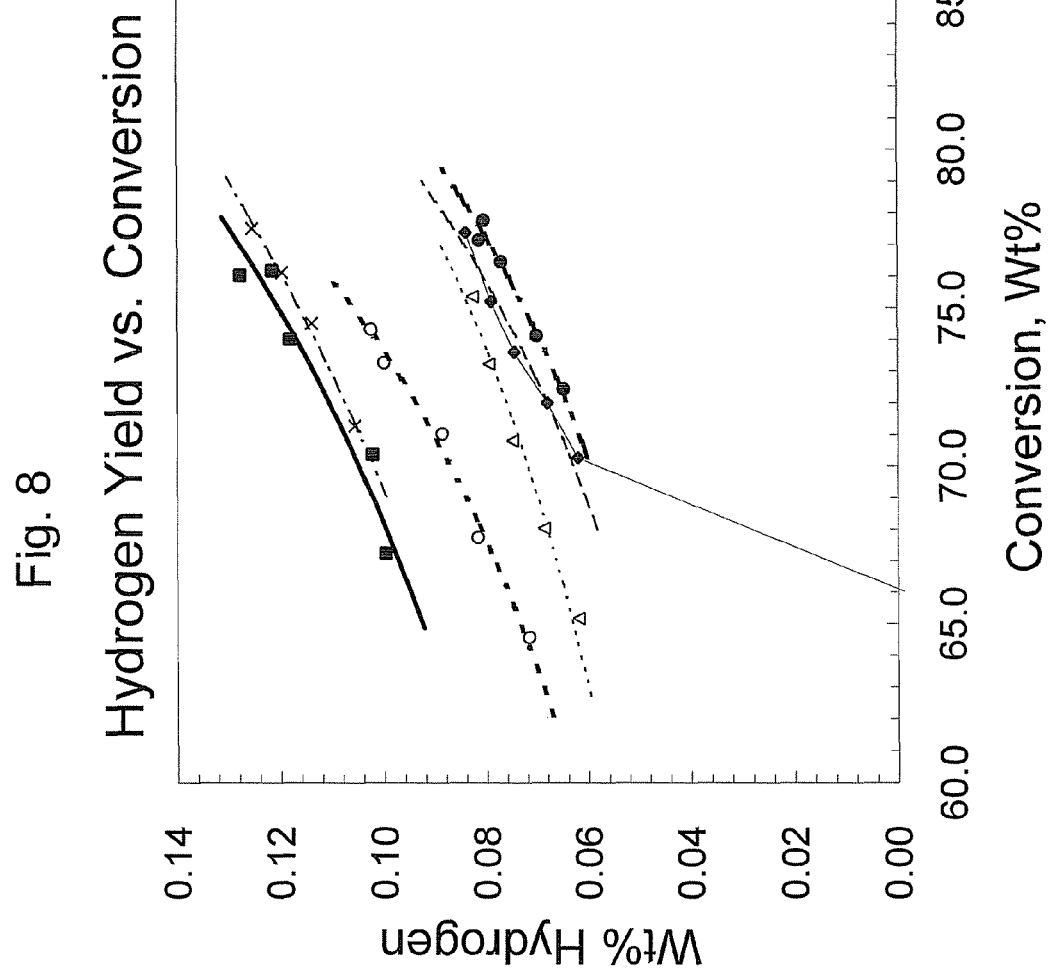
FIG. 8 is graph reporting experimental data indicating the relationship between conversion versus hydrogen yield.
Figure 9:
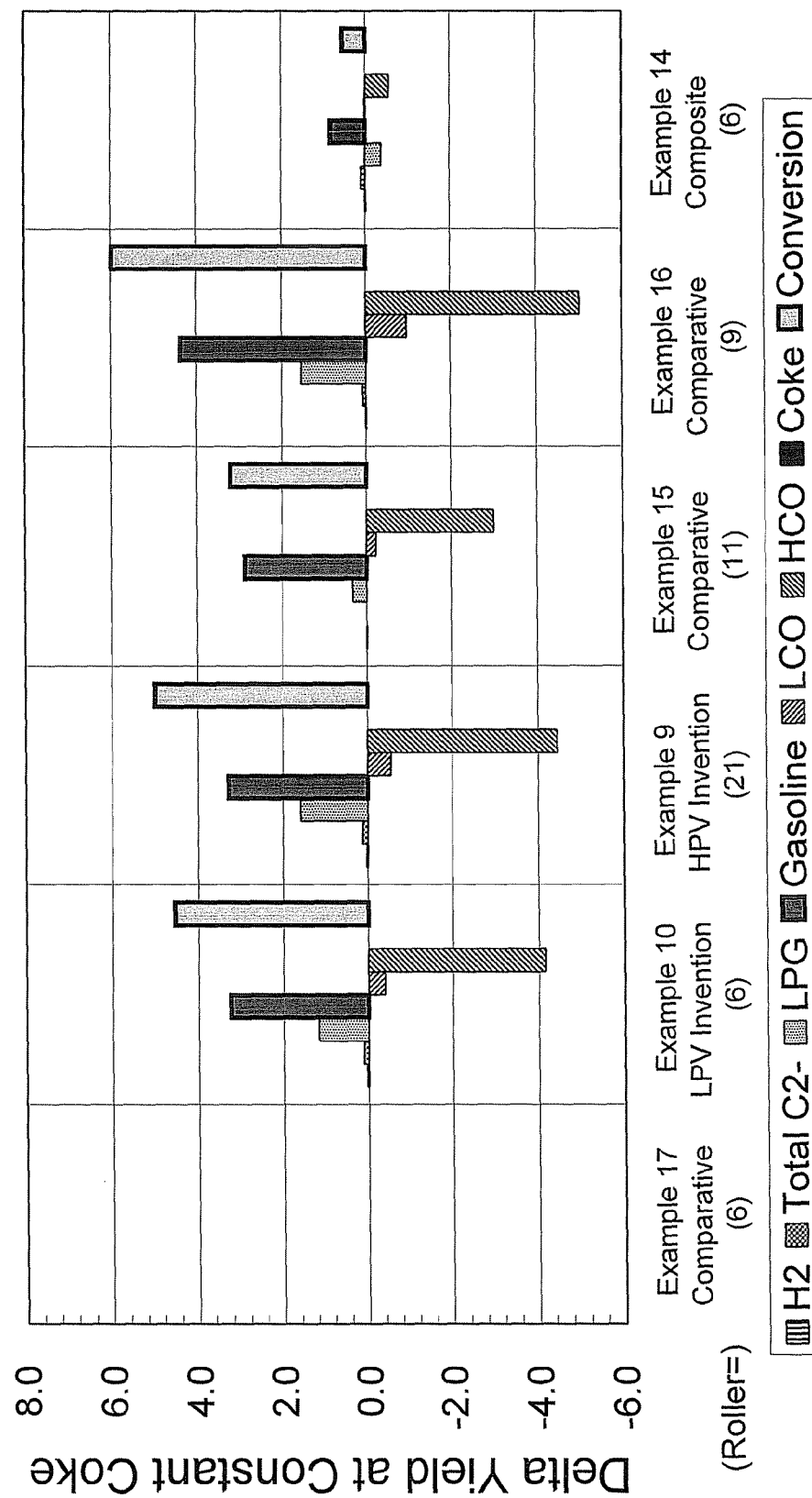
FIG. 9 is a bar graph reporting experimental data indicating yields for FCC catalysts of the invention are superior to conventional FCC catalysts with about the same attrition resistance.
Figure 10:
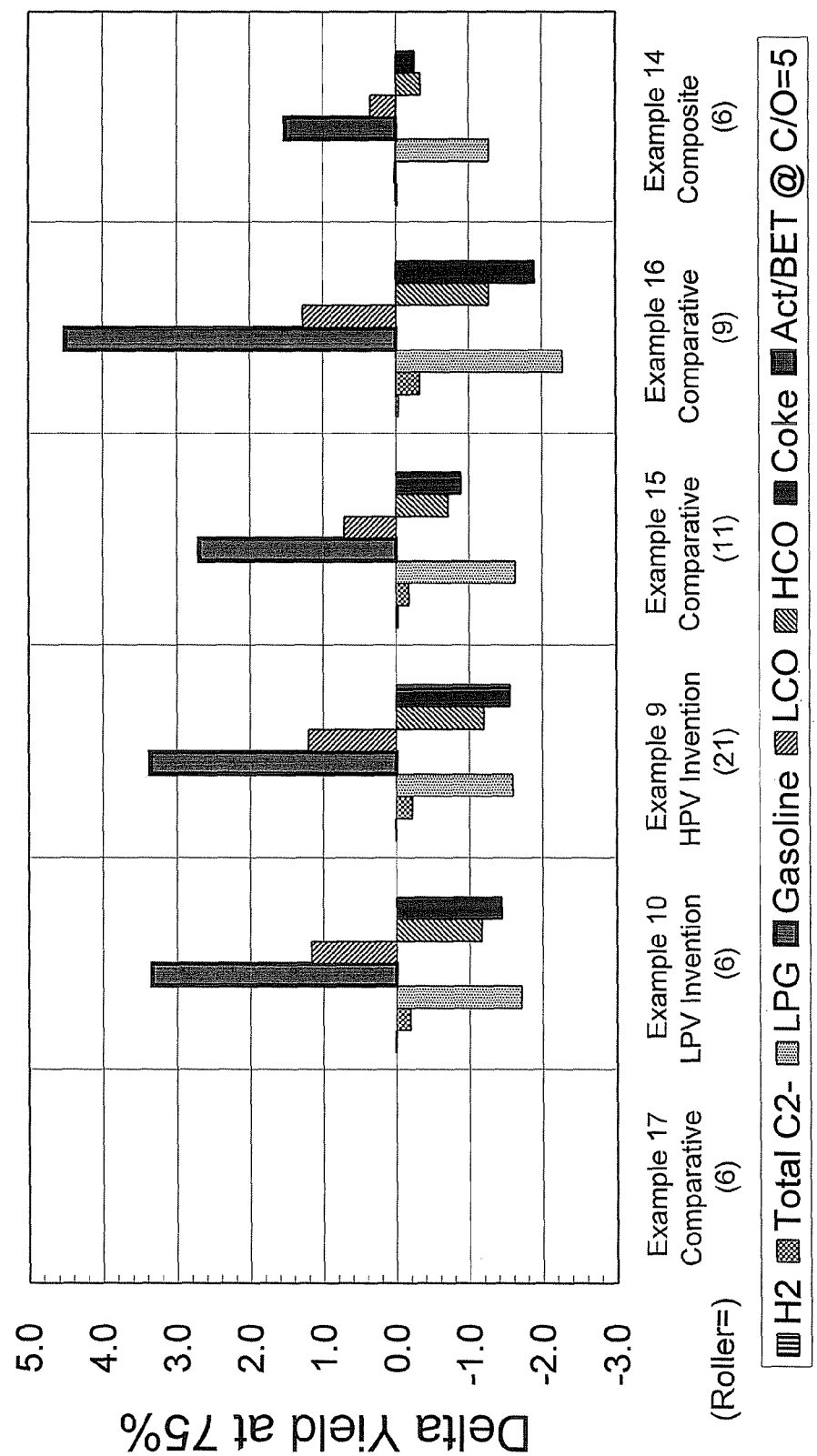
FIG. 10 is a bar graph reporting experimental data indicating yields for FCC catalysts of the invention are superior to conventional FCC catalysts with about the same attrition resistance.

It will be seen in the data that the lower pore volume invention Example 10 is still significantly higher than the comparative low pore volume catalyst Example 17. It is believed that the Invention Example 10 outperformed the prior art due to higher pore volume and/or of the core/shell morphology and/or the reduced diffusion path length. Comparative test results are depicted in FIGS. 5 to 10.

The ACE data do not show an improvement for the high pore volume, less attrition resistant embodiment of the Invention (Example 9) as compared to the Invention at lower pore volume (Example 10) or our prior art U.S. Pat. No. 6,656,347. One possible reason is that the catalyst is not further improved for catalytic cracking. Alternatively, the severity of the ACE test method, at least as was practiced, is too low to enable distinctions between catalysts at the highest levels of performance. It is believed that this surprising inability to distinguish is analogous to the surprising inability of the fixed bed MAT to distinguish between the U.S. Pat. No. 6,656,347 and the prior art cited therein.

Theoretical calculations {Intra-particle Mass Transfer and Contact Time Effects in FCC. David M. Stockwell. Prepr. Pap.-Am. Chem. Soc., Div. Petr. Chem. 2006, 51 (2), 460.} explain the shortcoming in terms of catalyst contact time, and further suggest that it is somewhat surprising that the ACE is able to make the distinction between U.S. Pat. No. 6,656,347 and the prior art cited therein. Thus not making the present distinction between Example 9 and the Invention at lower pore volume (Example 10) or U.S. Pat. No. 6,656,347 is more easily understood and accepted. It is believed that the higher pore volume Invention of Example 9 will indeed outperform all other technologies for gasoline and coke selectivity under riser cracking conditions however, since the initial rate of cracking in the riser is ca. 100 times higher than the average rate of cracking in a MAT or very well mixed fixed fluidized bed.

With respect to any figure or numerical range for a given characteristic, a figure or a parameter from one range may be combined with another figure or a parameter from a different range for the same characteristic to generate a numerical range.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A fluidizable cracking catalyst, comprising:
   from about 5% to less than 50% by volume a substantially inert core comprising mullite; and
   from 50% to about 95% by volume of an active shell comprising a NaY zeolite catalyst and a matrix, wherein the NaY zeolite catalyst is crystallized in the active shell after a slurry containing microspheres of mullite, NaY zeolite precursor, and matrix precursor is spray-dried,
   wherein the cracking catalyst maintains at least about 45% of original NaY zeolite surface area through standardized steaming.

2. The fluidizable cracking catalyst of claim 1, wherein the substantially inert core has an average cross section from about 30 to about 60 microns the active shell has an average thickness from about 5 to about 30 microns.

3. The fluidizable cracking catalyst of claim 1 having an average particle size from about 50 to about 100 microns.

4. The fluidizable cracking catalyst of claim 1, wherein the substantially inert core further comprises alpha-alumina.

5. The fluidizable cracking catalyst of claim 1, wherein the active shell comprises from about 40% to about 90% by weight of zeolite catalyst and from about 10% to about 60% by weight of matrix.

6. The fluidizable cracking catalyst of claim 1, wherein the matrix comprises at least one of silica, alumina such as gamma-alumina, mullite, silica-alumina, silica-magnesia, and clays such as kaolinite, halloysite, or montmorillonite.

7. The fluidizable cracking catalyst of claim 1 having a pore volume distribution wherein a first set of pores containing a porosity from about 0.03 to about 0.13 ml/g have a pore diameter of at least about 40 Å and at most about 100 Å, a second set of pores containing a porosity from about 0.03 to about 0.19 ml/g have a pore diameter of at least about 100 Å and at most about 600 Å, and a third set of pores containing a porosity from about 0.01 to about 0.24 ml/g have a pore diameter of at least about 600 Å and at most about 20,000 Å.

8. The fluidizable cracking catalyst of claim 1 having a first set of pores containing a porosity from about 0.05 to about 0.13 ml/g have a pore diameter of at least about 40 Å and at most about 100 Å, a second set of pores containing a porosity from about 0.03 to about 0.11 ml/g have a pore diameter of at least about 100 Å and at most about 600 Å, and a third set of pores containing a porosity from about 0.02 to about 0.01 ml/g have a pore diameter of at least about 600 Å and at most about 20,000 Å.

9. The fluidizable cracking catalyst of claim 1 having a first set of pores containing a porosity from about 0.04 to about 0.12 ml/g have a pore diameter of at least about 40 Å and at most about 100 Å, a second set of pores containing a porosity from about 0.1 to about 0.18 ml/g have a pore diameter of at least about 100 Å and at most about 600 Å, and a third set of pores containing a porosity from about 0.15 to about 0.21 ml/g have a pore diameter of at least about 600 Å and at most about 20,000 Å.

10. The fluidizable cracking catalyst of claim 1 having a surface area from about 100 to about 250 $m^2/g$.

11. The fluidizable cracking catalyst of claim 1, wherein the substantially inert core has a surface area of less than about 100 $m^2/g$.

12. The fluidizable cracking catalyst of claim 1, wherein the active shell surrounds at least about 75% of the substantially inert core surface.

13. A method of making a fluidizable cracking catalyst with an active shell at least partially surrounding a substantially inert core containing mullite, comprising:
    forming a slurry by combining at least water, about 1 to about 70 parts by weight hydrous kaolin, from about 1 to about 70 parts by weight spinel-form calcined kaolin, from about 1 to about 70 parts by weight mullite kaolin, and from about 1 to about 70 parts by weight substantially inert core microspheres containing mullite, and a zeolite precursor; and
    spray drying the slurry to form particles containing the substantially inert core microspheres with an active shell at least partially surrounding the substantially inert core; and
    crystallizing zeolite in the active shell to create the fluidizable cracking catalyst.

14. The method of claim 13 further comprising calcining the spray dried particles.

15. The method of claim 13, wherein the slurry comprises from about 40% by weight to about 70% by weight solids.

16. The method of claim 13, wherein the slurry further comprises at least one of a zeolite initiator or a source of sodium silicate.

17. The method of claim 13, wherein the zeolite shell precursor has a particle size where at least 90% by weight has a particle size of about 2 microns or less.

18. The method of claim 13, wherein the slurry comprises metakaolin.

19. The method of claim 13, wherein the inert core microspheres are internally seeded with a zeolite initiator.

20. The method of claim 13, wherein the slurry further comprises an aqueous zeolite initiator.

21. A cracking process, comprising:
    contacting a hydrocarbon feedstream and a cracking catalyst comprising from about 5% to less than 50% by volume a substantially inert core containing mullite and from 50% to about 95% by volume of an active shell comprising a zeolite catalyst and a matrix in a reactor at a temperature from about 300 to about 800° C. to provide a cracked product, wherein the cracking catalyst is prepared by spray drying a slurry, comprising water, microspheres of the substantially inert core, a zeolite precursor, and a matrix precursor, and crystallizing the zeolite catalyst in the active shell.

22. The cracking process of claim 21, wherein the hydrocarbon feedstream comprises one or more of gas oil, steam cracked gas oil and residues, heavy and reduced petroleum crude oil, petroleum atmospheric distillation bottom, petroleum vacuum distillation bottom, heating oil, pitch, asphalt, bitumen, other heavy hydrocarbon residues, tar sand oils, shale oil, liquid products derived from coal liquefaction processes, steam heating oil, jet fuel, diesel, kerosene, gasoline, coker naphtha, steam cracked naphtha, catalytically cracked naphtha, hydrocrackate, reformate, raffinate reformate, Fischer-Tropsch liquids, Fischer-Tropsch gases, natural gasoline, distillate, virgin naphtha, C5+ olefins, C5+ paraffins, ethane, propane, butanes, butenes, or butadiene.

23. The cracking process of claim 21, wherein the cracked product comprises one or more of hydrogen, light olefins, light paraffins, olefins having more than five carbon atoms, paraffins having more than five carbon atoms, cracked naphtha, cracked gas oil, tar, or coke.

* * * * *